Oct. 23, 1934.  W. BARBER  1,977,712
DEMOUNTABLE DEEP CENTER RIM
Filed Feb. 6, 1928
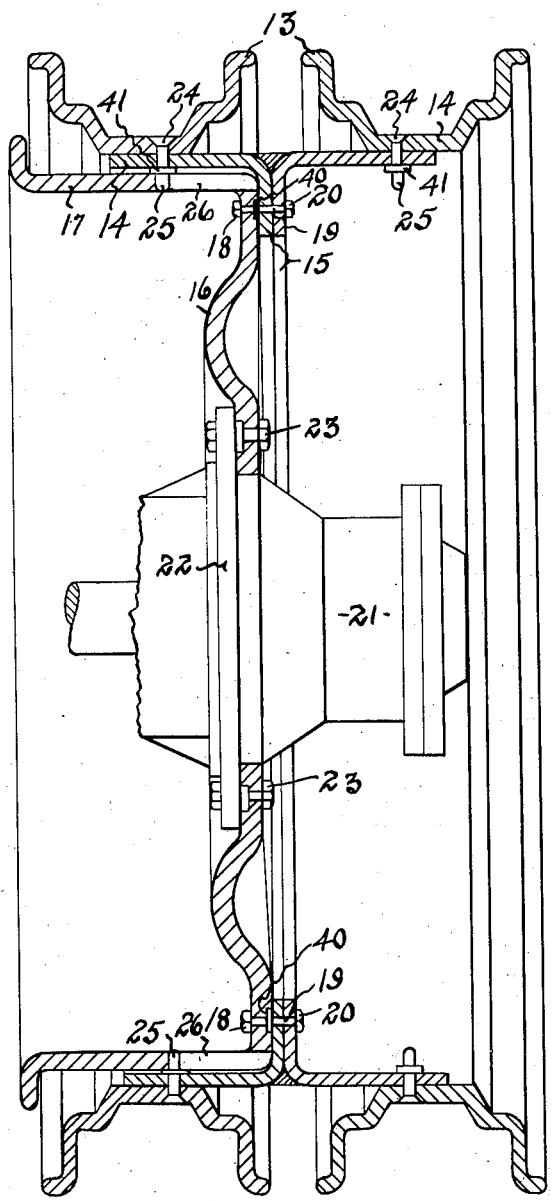
INVENTOR
William Barber
BY
ATTORNEYS.

Patented Oct. 23, 1934

1,977,712

UNITED STATES PATENT OFFICE 1,977,712

DEMOUNTABLE DEEP-CENTER RIM

William Barber, Brooklyn, N. Y.

Application February 6, 1928, Serial No. 252,162

1 Claim. (Cl. 301—6)

This invention relates to automobile tire carrying means, the object of which is to provide a means whereby the metal disk may be dispensed with, and a deep center rim is detachably mounted directly on the periphery of the brake drum.

A further object of the invention is to provide a tire carrying means in which the disk-forming brake drum is detachably mounted to the radial member of the hub sleeve.

A further object of the invention is to provide a quick demountable deep-center rim from which the tire may be easily and readily removed.

A further object of the invention is to provide an article neat in appearance, cheap in construction, and light in weight, wherein the rim is attached directly to the brake drum.

A still further object of the invention is to provide a deep-center rim of the dual type which is interchangeable and can be placed on either side of the car as desired.

At the present time, with the large diameter tire and the small wheel, and the four-wheel brakes, it is necessary to change the structure of the rim for the application of the tires to the wheel. Owing to the large brake drums, and small wheels, the tires get heated from the friction of applying the brake and where dual-tires are used, the dual wheels add an extra weight. With my new method I do away with that. I decrease the weight of the structure and keep the tires and brake drum cool, by applying the deep-center rim direct to the brake drum.

The invention consists substantially in the construction, combination, location and relative arrangement of parts, all as will be more fully hereinafter set forth, as shown in the accompanying drawing, and finally pointed out in the appended claim.

Referring to the drawing

The single figure is a vertical central cross-sectional view, showing the hub in elevation, of a dual type deep-center rim applied to the brake drum.

While in the drawing I have illustrated a specific embodiment of the invention, it will of course be understood that minor changes and variations, in the particular construction shown, and the embodiment of the invention in other forms, as will appeal to those skilled in the art, and falling within the scope of the appended claim, may be practical without departing from the spirit of the invention.

Referring more specifically to the structure as illustrated in the single figure of the drawing, it will be seen that it comprises a pair of deep-center rims 13 mounted upon a pair of rings comprising the flat portions 15 and the flanged portions 14 extending at right angles thereto. The brake drum comprises a cylindrical braking portion 17 formed integral with a web portion 16 which is of curved or corrugated cross-section having a central aperture at which it is firmly secured to the flange 22 of the hub 21 by a series of bolts 23. The rings 15—15 are bolted together and to the web of the drum by means of the bolts 19 which are threaded at each end and are provided with the nuts 18 and 20 on the opposite ends thereof. The bolts 19 are provided with an integral collar 40 intermediate the ends thereof, which in conjunction with the nuts 20 serve to lock the portions 15 of the rings together. Nuts 18 may be independently removed and attached so that the drum can be applied or removed without disturbing the rings with the rims mounted thereon.

The rims are attached to the rings by means of rivets 24 which have the collars 41 formed integral therewith so that the rims and rings may be secured together. The rivets have the extending ends 25 which project below the rings and are positioned so as to engage slots 26 in the portion 17 of the drum so that when the drum is slipped into place the lugs 25 of the rivets lie in the grooves 26, thus serving to lock the drum in place against relative displacement with respect to the rings and rims. The action of these lugs supplements the action of the bolts 19 and serves to further strengthen the structure. As will be apparent to those skilled in the art, the structure is such that the brake drum may be applied to either side of the rings upon which the rims are supported. It is also apparent to those skilled in the art that the rivets 24 may be independent of the lugs 25 and may even be eliminated where the rims are welded to the rings. In this case the lugs 26 would comprise separate elements provided solely for the purpose of locking the drum against relative displacement with respect to the rings and rims.

From the foregoing description it will be seen that I provide an exceedingly simple but highly efficient tire carrying rim which may be mounted and demounted to and from brake drum without disturbing hub, bearings, axle, or any part whatsoever.

Having thus described my invention, what I claim and desire to secure by Letters Patent is:—

In a standard diameter wheel of the class described a hub having an integral circumferential flange, a brake drum having a corrugated web secured to said hub flange and serving as the wheel web, a plurality of demountable deep center rims one of which is seated over the brake drum and each of which has a flange by which it is secured to said web, and a lug carried by each of said rims for engaging with said brake drum and preventing relative displacement.

WILLIAM BARBER.